(12) United States Patent
Boyd et al.

(10) Patent No.: US 8,108,364 B2
(45) Date of Patent: Jan. 31, 2012

(54) REPRESENTATION OF SYSTEM CLOCK CHANGES IN TIME BASED FILE SYSTEMS

(75) Inventors: Kenneth Wayne Boyd, Tucson, AZ (US); Kenneth Fairclough Day, III, Tucson, AZ (US); Douglas William Dewey, Tucson, AZ (US); Christopher Diebold O'Toole, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 12/187,301

(22) Filed: Aug. 6, 2008

(65) Prior Publication Data

US 2010/0036895 A1    Feb. 11, 2010

(51) Int. Cl.
*G06F 7/00* (2006.01)
*G06F 17/00* (2006.01)
(52) U.S. Cl. .......................... 707/690; 707/694
(58) Field of Classification Search ............ None
See application file for complete search history.

(56) References Cited

U.S. PATENT DOCUMENTS

| | | | |
|---|---|---|---|
| 5,751,721 A | 5/1998 | Bloks | |
| 6,233,238 B1 | 5/2001 | Romanowski et al. | |
| 6,553,389 B1 * | 4/2003 | Golding et al. | 1/1 |
| 6,584,477 B1 * | 6/2003 | Mosher, Jr. | 707/610 |
| 6,803,579 B2 | 10/2004 | Williams et al. | |
| 7,055,051 B2 | 5/2006 | Shinkawa | |
| 7,100,099 B2 | 8/2006 | Niijima | |
| 7,194,648 B2 | 3/2007 | Heinrich et al. | |
| 2002/0104004 A1 | 8/2002 | Couillard | |
| 2003/0145248 A1 * | 7/2003 | McNeil | 714/13 |
| 2005/0102326 A1 * | 5/2005 | Peleg et al. | 707/200 |
| 2006/0146850 A1 | 7/2006 | Virdi et al. | |

OTHER PUBLICATIONS

U.S. Patent Application entitled "Time Based File System for Continuous Data Protection", U.S. Appl. No. 12/147,384, filed Jun. 26, 2008, by inventors T.W. Beglin, K.W. Boyd, K.F. Day III, and D.W. Dewey.

* cited by examiner

*Primary Examiner* — Jay Morrison
(74) *Attorney, Agent, or Firm* — Rabindranath Dutta; Konrad Raynes & Victor LLP

(57) ABSTRACT

A plurality of data units with associated timestamps is stored in a time based file system, wherein a timestamp corresponds to a time indicated by a system clock. A time indicated by the system clock is changed while the plurality of data units is being stored. A plurality of epochs is stored in a data structure, wherein an epoch is a period of time between a starting and an ending timestamp selected from the timestamps, and wherein successive epochs have overlapping time periods. The time based file system is reverted to an earlier point in time based on the plurality of epochs stored in the data structure.

20 Claims, 8 Drawing Sheets

REPRESENTATION OF SYSTEM CLOCK CHANGES IN TIME BASED FILE SYSTEMS

BACKGROUND

1. Field

The disclosure relates to a method, system, and article of manufacture for the representation of system clock changes in time based file systems.

2. Background

Information technology systems, including storage systems, may need protection from site disasters or outages. Furthermore, information technology systems may require features for data migration, data backup, or data duplication. Implementations for disaster or outage recovery, data migration, data backup, and data duplication may include mirroring or copying of data from one storage system to another. For example, in certain information technology systems, data may be replicated from a primary storage system to a secondary storage system. If the primary storage system is unavailable, then the replicated data in the secondary storage system may be used instead of the unavailable data in the primary storage system.

Recovery point objective is the point in time to which data must be restored in order to resume processing after a loss of data. For example, if a trade execution program of a stock exchange fails then certain data may be lost if all data is not synchronously backed up to the secondary storage. The recovery point objective is the point in time to which the trade execution program and any lost data should be restored. To achieve recovery point objectives and also for other reasons, a time based file system may be used. A time based file system is a file system in which the image, i.e., copy, of the file system at any point in time is preserved. The preserved image may be used to revert back the file system to an earlier point in time, wherein the file system may be reverted to the earlier point in time for a variety of reasons, including the occurrence of site disasters or outages.

SUMMARY OF THE PREFERRED EMBODIMENTS

Provided are a method, system, and article of manufacture in which a plurality of data units with associated timestamps is stored in a time based file system, wherein a timestamp corresponds to a time indicated by a system clock. The time indicated by the system clock is changed while the plurality of data units is being stored. A plurality of epochs is stored in a data structure, wherein an epoch is a period of time between a starting and an ending timestamp selected from the timestamps, and wherein successive epochs have overlapping time periods. The time based file system is reverted to an earlier point in time based on the plurality of epochs stored in the data structure.

In certain additional embodiments, a first data unit of the plurality of data units is written to the time based file system with an associated first timestamp. A second data unit of the plurality of data units is written to the time based file system with an associated second timestamp, wherein the second data unit is written after the first data unit, and wherein no data units are written between the writing of the first data unit and the writing of the second data unit. A new epoch is stored in response to determining that the first timestamp is behind the second timestamp in time, wherein the second data unit is associated with the new epoch, and wherein the new epoch and an immediately previously stored epoch associated with the first data unit have an overlapping time period.

In yet additional embodiments, the data structure is an epoch information repository. A starting timestamp of the new epoch is indicated in the epoch information repository, wherein the starting timestamp is the second timestamp. An ending timestamp of the immediately previously stored epoch is indicated in the epoch information repository, wherein the ending timestamp of the immediately previously stored epoch in the epoch information repository is the first timestamp, and wherein the ending timestamp of the new epoch is entered after another new epoch has been started.

In further embodiments, a time based file system driver performs the storing in the time based file system of the plurality of data units, the storing in the data structure of the plurality of epochs, and the reverting of the time based file system to the earlier point in time, and wherein the time based file system driver comprises: (i) a data unit writing application that writes the plurality of data units with the associated timestamps; (ii) a timestamp comparator that compares the timestamps of two successively written data units; (iii) an epoch generator that generates the plurality of epochs; and (iv) a file system reversion application that allows the time based file system to be reverted to the earlier point in time.

In yet further embodiments, the file system reversion application displays overlapping epochs. A selection is made by a user of one of the overlapping epochs. The file system is reverted to the earlier point in time based on the selected epoch.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Time Based File System and System Clock Changes

In a time based file system the problem of handling system clock changes may need to be addressed, wherein a system clock change refers to an abrupt modification of the time shown by the system clock. For example, the change to daylight savings time may cause a system clock change. Additionally, the system clock may be erroneously or arbitrarily changed by an administrator or a user.

A user interface, including a graphical user interface (GUI) or a command line interface, may present to a user various mechanisms to select older images of the time based file system to view. When a system clock is capable of being changed, in certain situations the timestamps alone cannot be used to revert the file system to an earlier point in time. It may not be possible to determine whether to revert the file system back to a time in accordance with the time shown by the system clock before the abrupt modification to the system clock, or whether to revert the file system back to a time in accordance with the time shown by the system clock after the abrupt modification to the system clock.

Certain embodiments provide mechanisms for detecting, tracking and representing to a user the system clock changes and ways to navigate to different points in time when file system timestamps have not been monotonically increasing. In certain embodiments, timestamps may not be monotonically increasing because of abrupt changes in the time indicated by the system clock.

In certain embodiments, a data structure that represents elements referred to as "epochs" is provided. An epoch is a range of time that may be indicated by timestamps, wherein the timestamps are such that there is no decrease in time in the timestamps for files written chronologically to a time based file system. The epochs may be numbered sequentially.

The GUI/command line may present to a user a plurality of epochs, wherein an epoch may show the first and last timestamps used in the epoch. The plurality of epochs may be presented chronologically by the numbering of the epochs. The user may visually inspect the plurality of epochs and may be able to determine which time ranges fell within which epoch. The user may then determine which epoch to use for reverting a file system to a previous point in time. Once an epoch is selected, within the selected epoch the timestamp information may be used to navigate to a desired point in time to view the file system. As a result, the user can navigate to various points in time and view the file system image even when system clock changes have occurred over the lifetime of the file system.

Exemplary Embodiments

Figure 1:
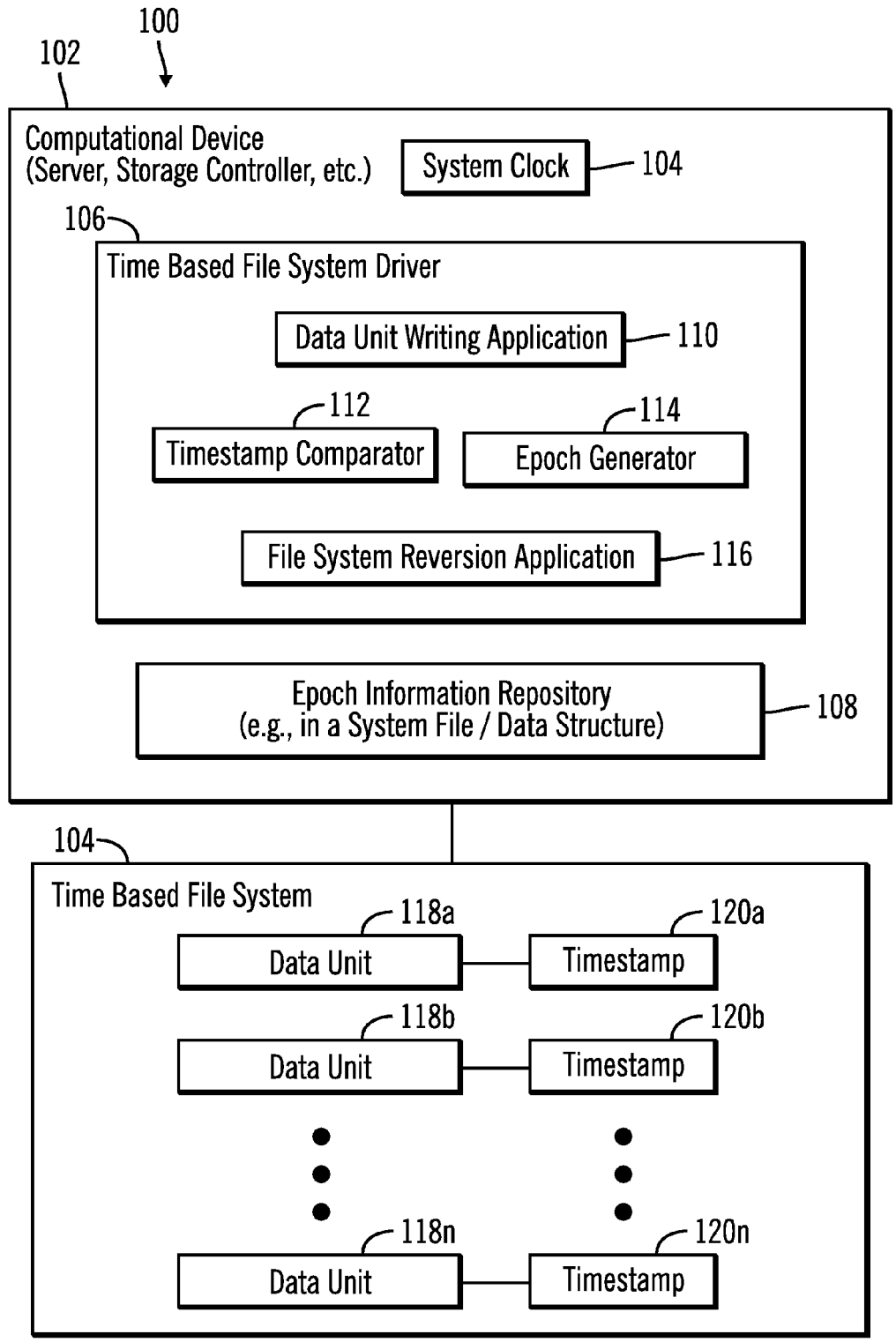
FIG. 1 illustrates a block diagram of a computing environment in which a computational device is coupled to a time based file system, in accordance with certain embodiments.

FIG. 1 illustrates a block diagram of a computing environment 100 in which a computational device 102 is coupled to a time based file system 104, in accordance with certain embodiments. The computational device 102 may comprise any suitable computational device known in the art, such as, a personal computer, a mainframe computer, a midrange computer, a storage controller, a library manager, a telephony device, a handheld computer, etc. The time based file system 104 may be a file system implemented on any suitable storage device known in the art, such as, a disk storage device, an optical storage device, etc.

The computational device 102 includes a system clock 104, a time based file system driver 106, and an epoch information repository 108. The system clock 104 indicates the time that is used to timestamp files in the time based filed system, and the time indicated by the system clock 104 is capable of being arbitrarily or abruptly changed. The time based file system driver 106 is an application that is a file system driver program corresponding to the time based file system 104. In certain embodiments, the epoch information repository 108 may be implemented in a system file, wherein information included in the epoch information repository 108 may be implemented in any suitable data structure. The epoch information repository 108 stores information on epochs associated with the writing of data units in the time based file system 104.

The time based file system driver 106 includes a data unit writing application 110, a timestamp comparator 112, an epoch generator 114 and a file system reversion application 116. The data unit writing application 110 writes data units 118a, 118b, ..., 118n and corresponding timestamps 120a, 120b, ..., 120n to the time based file system 104. For example, if the time indicated by the system clock is "t1" then when the data unit writing application 110 writes the data unit 118a at time "t1", the data unit writing application 110 also writes the timestamp 120a associated with the data unit 118a and the timestamp 120a is written as the time "t1". The timestamp 120a may provide indications for the day, the hour, the minute, and the second, in accordance with the time indicated by the system clock 104.

The timestamp comparator 112 is an application that can compare two timestamps. The epoch generator 114 is an application that generates new epochs when certain conditions are satisfied. The file system reversion application 116 is an application that reverts the time based file system 104 to an earlier point in time.

Figure 2:
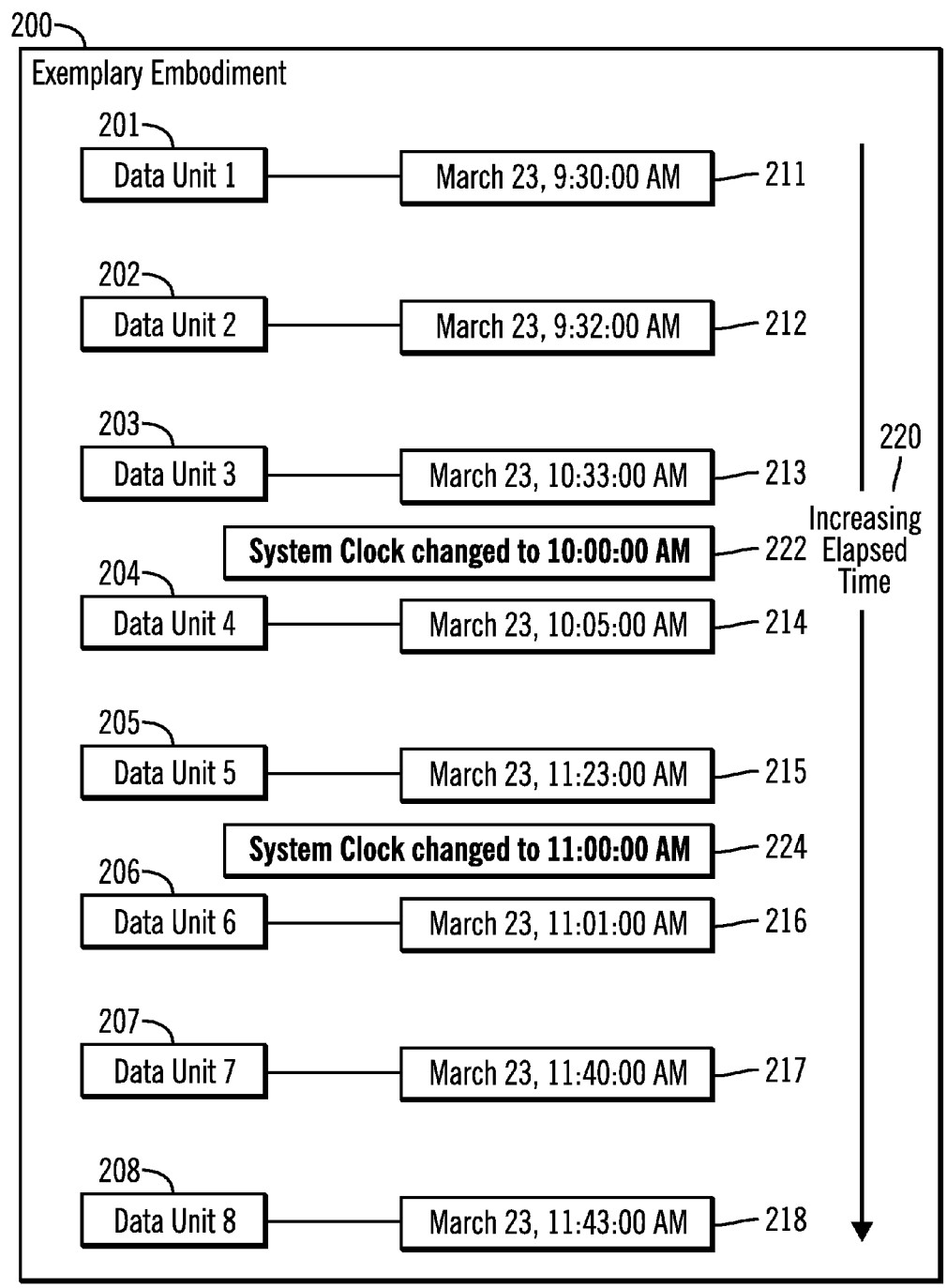
FIG. 2 shows a block diagram of data units written on a time based file system, in accordance with certain embodiments.

FIG. 2 shows a block diagram of data units written on the time based file system 104 in an exemplary embodiment 200, in accordance with certain embodiments. A plurality of data units, shown as data units 1-8 (reference numerals 201, 202, 203, 204, 205, 206, 207, 208) are written on the time based file system 104 by the data unit writing application 110. The associated timestamps are also written as shown by the reference numerals 211, 212, 213, 214, 215, 216, 217, 218. As shown by the arrow depicted by reference numeral 220, the actual elapsed time increases as the data units 1-8 (reference numerals 201, 202, 203, 204, 205, 206, 207, 208) are written.

After data unit 3 (reference numeral 203) has been written with timestamp March 23, 10:33:00 AM (reference numeral 213), the system clock 104 is abruptly changed (reference numeral 222) to 10:00:00 AM (the date stays the same). Then when data unit 4 (reference numeral 204) is written the timestamp may be written as March 23, 10:05:00 AM (reference numeral 214). Thus the abrupt change in the system clock 104 has caused the timestamp 214 of data unit 4 (reference number 204) to be ahead of the timestamp 213 of data unit 3 (reference numeral 203), even though the data unit 4 (reference numeral 204) was written after the data unit 3 (reference numeral 203) was written (for the purposes of the disclosure a time of 10:05:00 AM is ahead of the time of 10:33:00 AM, i.e., an earlier time is "ahead of" a later time). A similar situation occurs when the system clock 104 is abruptly changed (reference numeral 224) between the writing of the data unit 5 (reference numeral 205) and the writing of the data unit 6 (reference numeral 206), as can be seen from the value of the two timestamps provided by reference numerals 215 and 216.

Therefore, FIG. 2 illustrates certain embodiments in which an abrupt change in the system clock 104 causes certain recently written data units to have timestamps that appear to be ahead of the timestamps corresponding to certain earlier written data units.

Figure 3:
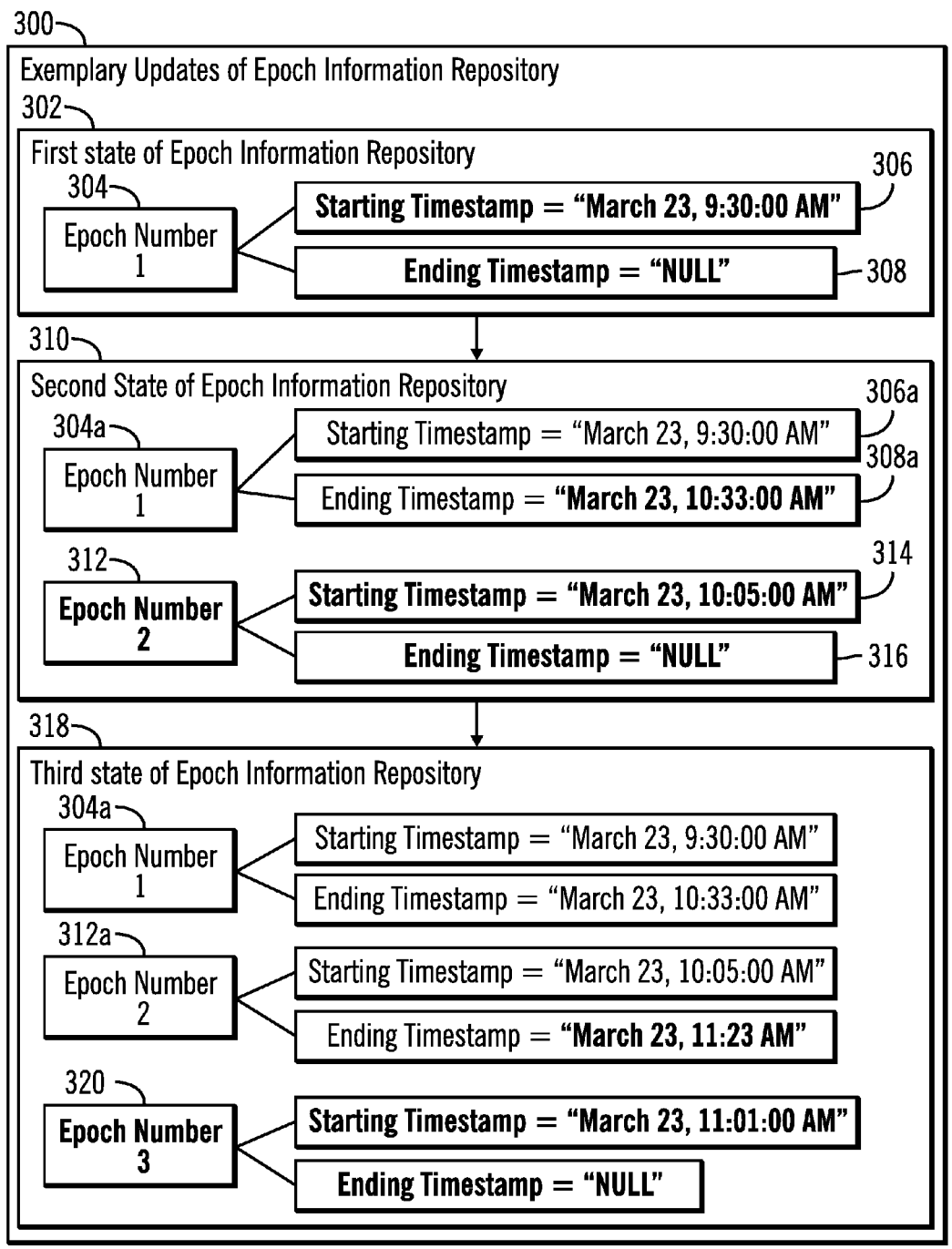
FIG. 3 illustrates a block diagram of exemplary updates to an epoch information repository, in accordance with certain embodiments.

FIG. 3 illustrates a block diagram of exemplary updates 300 to the epoch information repository 108, in accordance with certain embodiments. The updates to the epoch information repository 108 are shown when the data units 1-8

(reference numerals 201, 202, 203, 204, 205, 206, 207, 208 of FIG. 2) are written in the exemplary embodiment 200 shown in FIG. 2.

When the data unit 1 (reference numeral 201) is written the first state 302 of the epoch information repository 108 is shown. In the first state 302, the epoch information repository 108 has only one epoch that is shown as epoch number 1 (reference numeral 304) where the starting timestamp 306 of epoch number 1 (reference numeral 304) is indicated as March 23, 9:30:00 AM which is the same as the timestamp 211 of the data unit 1 (reference numeral 201) shown in FIG. 2. The ending timestamp 308 of epoch number 1 (reference numeral 304) is not known in the first state 302 of the epoch information repository and is set to "NULL". The ending timestamp 308 may be updated when a new epoch is started because the system clock 104 may get abruptly changed to a time that causes overlapping timestamps to occur in the time based file system 104.

After a period of time when data unit 4 (reference numeral 204) is written as shown in FIG. 2, the second state 310 of the epoch information repository 108 is shown. The newly written information is shown in bold font within the second state 310 of the epoch information repository 108. When the data unit 4 (reference numeral 204) is written, a new epoch called epoch number 2 (reference numeral 312) is started, wherein epoch number 2 (reference numeral 312) has a starting timestamp 314 that is the same as the timestamp 214 of data unit 4 (reference numeral 204) as shown in FIG. 2. The ending timestamp 316 of epoch number 2 (reference numeral 312) is set to be null. The ending timestamp 308a of epoch number 1 (epoch number 1 is shown via reference numeral 304a within the second state 310) is now updated to the timestamp of data unit 3 (reference numeral 203 in FIG. 2) that was written immediately preceding the writing of data unit 4 (reference numeral 204 of FIG. 2), wherein the system clock 104 abruptly changed between the writing of the data unit 3 (reference numeral 203 in FIG. 2) and the writing of the data unit 4 (reference numeral 204 in FIG. 2). Thus epoch number 1 (reference numeral 304a) represents the time range between the starting timestamp 306a and the ending timestamp 308a, whereas the time range of epoch number 2 (reference numeral 312) is not fully known until the next epoch is started.

FIG. 3 also shows a third state 318 of the epoch information repository 108, wherein the third state 318 commences after the system clock 104 is abruptly changed (reference numeral 224 of FIG. 2) between the writing of the data unit 5 (reference numeral 205 of FIG. 2) and data unit 6 (reference numeral 206 of FIG. 2). It can be seen that there are now three epochs, shown as epoch number 304a, 312a, 320, wherein epoch number 3 (reference numeral 320) is the newly started epoch. The starting and ending timestamps of the epochs are retained or updated in a manner analogous to the retention and update of timestamps as described for the second state 310 of the epoch information repository 108.

It should be noted that not all system clock changes will result in a new epoch being started. For example, if the system clock 104 is abruptly changed to move the time forward a new epoch does not have to be started. Additionally, even if the system clock 104 is moved backwards but the timestamps of the data units still remain in chronologically increasing order then no new epoch is started. A new epoch that is started has at least some overlapping time period with the immediately preceding epoch.

Therefore, FIG. 3 illustrates certain embodiments in which the generation of new epochs is shown, and the construction of the starting and ending timestamps associated with each epoch are shown.

Figure 4:
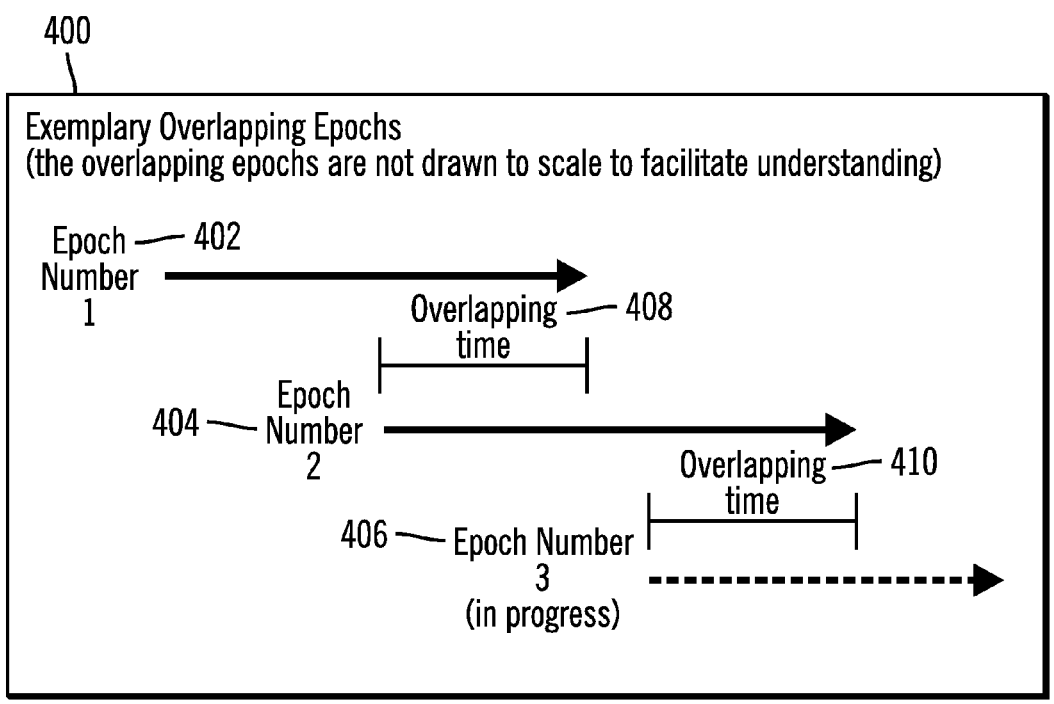
FIG. 4 illustrates a block diagram of overlapping epochs, in accordance with certain embodiments.

FIG. 4 illustrates a block diagram of overlapping epochs 400, in accordance with certain embodiments. In FIG. 4, Epoch number 1, 2 and 3 (reference numerals 402, 404, 406) are shown, wherein epoch number 3 (reference numeral 406) is still in progress, i.e., the ending timestamp corresponding to epoch number 3 is not yet known and will be known when epoch number 4 is started. It can be seen that epoch number 1 (reference numeral 402) and epoch number 2 (reference numeral 404) have an overlapping time 408, and epoch number 2 (reference numeral 404) and epoch number 3 (reference numeral 406) have an overlapping time 410.

In certain embodiments, a user may be shown a graphical representation of the overlapping epochs 400 as illustrated in FIG. 4. A user may use the graphical representation of the overlapping epochs 400 to determine which epoch to revert back to when the time based file system 104 is to be reverted back to an earlier point in time.

Figure 5:
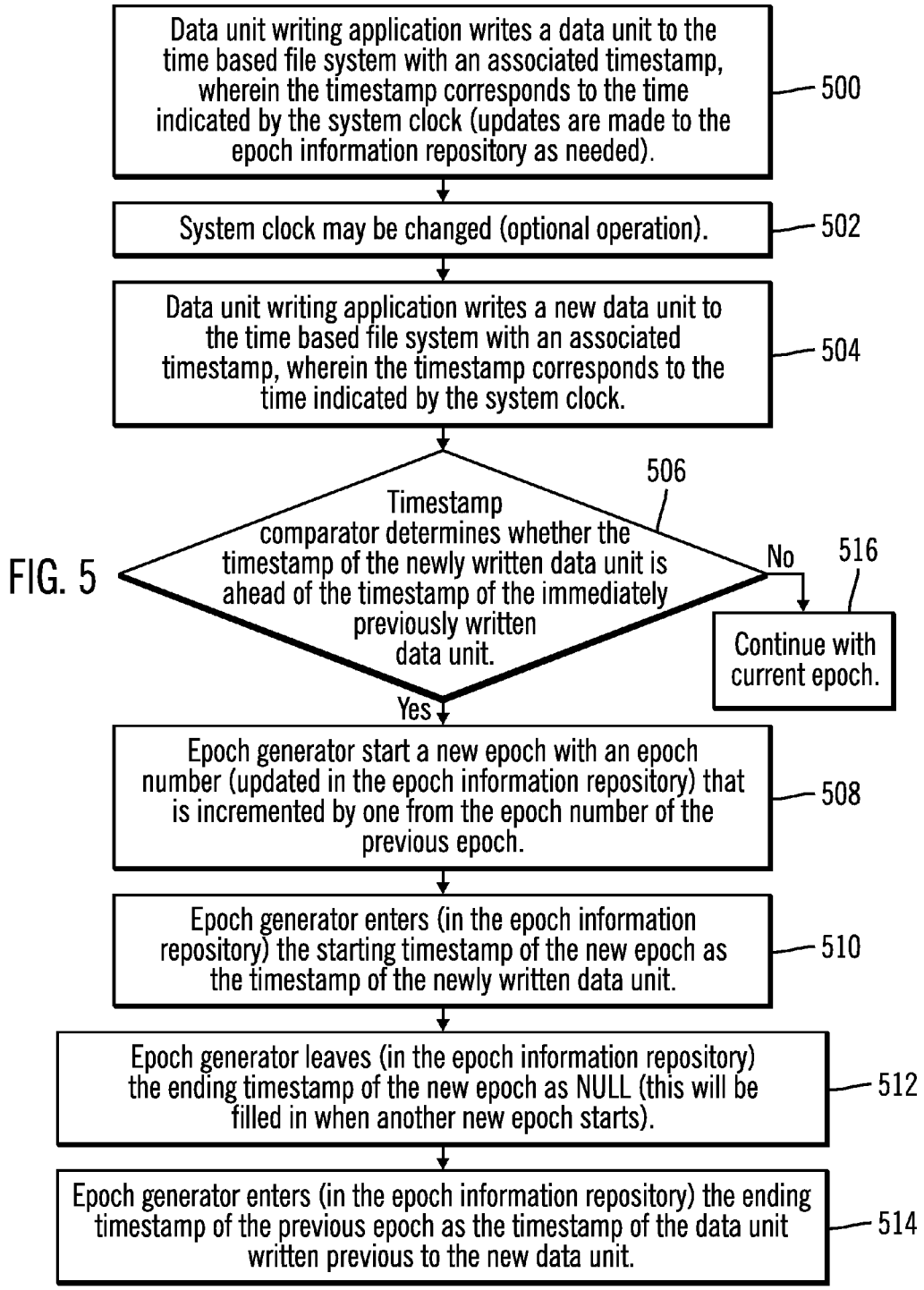
FIG. 5 illustrates a flowchart that shows first operations, in accordance with certain embodiments.

FIG. 5 illustrates a flowchart that shows first operations, in accordance with certain embodiments. The first operations illustrated in FIG. 5 may be implemented in certain embodiments in the computational device 102.

Control starts at block 500 in which the data unit writing application 110 writes a data unit to the time based file system 104 with an associated timestamp, wherein the timestamp corresponds to the time indicated by the system clock 104, and wherein updates are made to the epoch information repository 108 as needed.

Control proceeds to block 502 in which in an optional operation the system clock 104 may be abruptly or arbitrarily changed. Then the data unit writing application 110 writes (at block 504) a new data unit to the time based file system 104 with an associated timestamp, wherein the timestamp corresponds to the time indicated by the system clock 104.

The timestamp comparator 112 determines (at block 506) whether the timestamp of the newly written data unit is ahead of (for the purposes of the disclosure a time of 2 PM is ahead of the time of 3 PM, i.e., an earlier time is "ahead of" a later time) the timestamp of the immediately previously written data unit. If so, then the epoch generator 114 starts (at block 508) a new epoch with an epoch number (updated in the epoch information repository 108) that is incremented by one from the epoch number of the previous epoch.

The epoch generator 114 enters (at block 510) in the epoch information repository 108 the starting timestamp of the new epoch to be the same as the timestamp of the newly written data unit. The epoch generator leaves (at block 512) in the epoch information repository 108 the ending timestamp of the new epoch as NULL (this will be filled in when another new epoch starts).

Control proceeds to block 512 in which the epoch generator 114 enters (in the epoch information repository 108) the ending timestamp of the previous epoch to be same as the timestamp of the data unit written previous to the new data unit.

If at block 506, the timestamp comparator 112 determines that the timestamp of the newly written data unit is not ahead of the timestamp of the immediately previously written data unit then the process continues with current epoch.

Therefore, FIG. 5 illustrates certain embodiments that show how and when new epochs are generated in response to an abrupt or arbitrary modification to the time indicated by the system clock 104.

Figure 6:
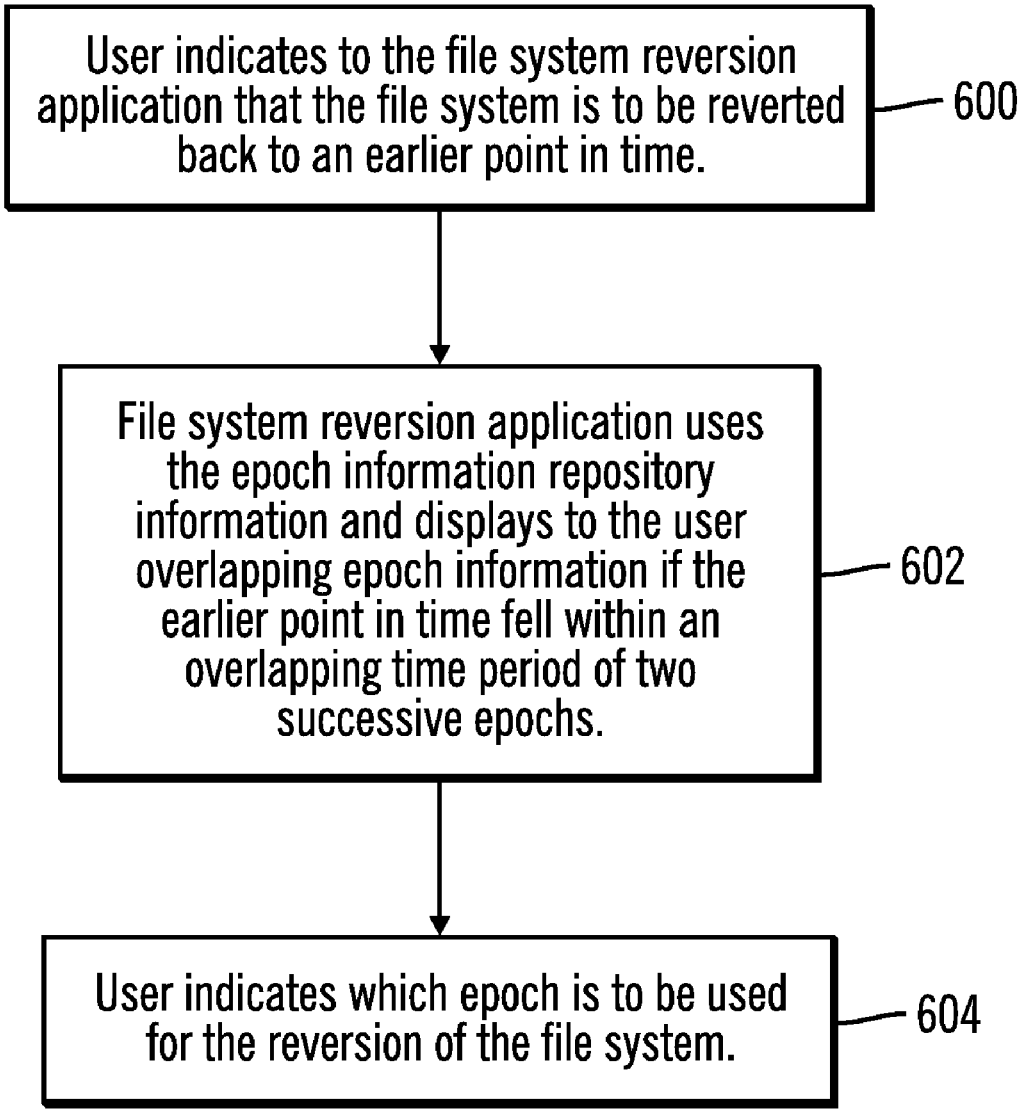
FIG. 6 illustrates a flowchart that shows second operations, in accordance with certain embodiments.

FIG. 6 illustrates a flowchart that shows second operations, in accordance with certain embodiments. The second operations illustrated in FIG. 6 may be implemented in certain embodiments in the computational device 102.

Control starts at block 600 in which a user indicates to the file system reversion application 116 that the time based file system 104 is to be reverted back to an earlier point in time. The file system reversion application 116 uses (at block 602) the epoch information repository information 108 and displays to the user overlapping epoch information 400 if the earlier point in time fell within an overlapping time period of two successive epochs. The user indicates (at block 604) which epoch is to be used for the reversion of the time based file system 104 to an earlier point in time.

Therefore, FIG. 6 illustrates certain embodiments in which an abrupt or arbitrary change in the system clock 104 may still allow a user to revert a file system to an earlier point in time by indicating to the user the overlapping epochs. The user selects a time corresponding to one epoch by reviewing the overlapping epochs.

Figure 7:
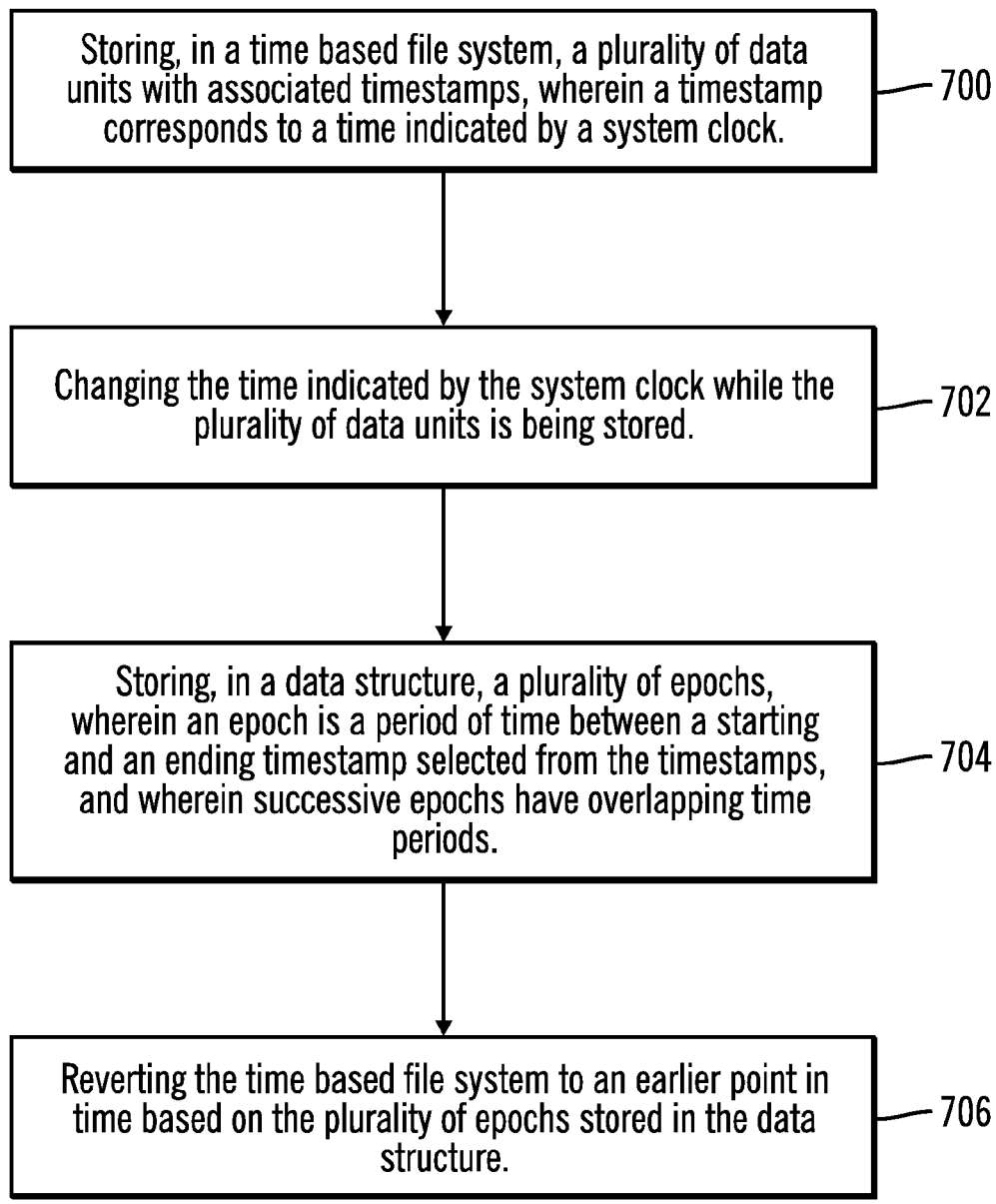
FIG. 7 illustrates a flowchart that shows third operations, in accordance with certain embodiments.

FIG. 7 illustrates a flowchart that shows third operations, in accordance with certain embodiments. The third operations illustrated in FIG. 7 may be implemented in certain embodiments in the computational device 102.

A plurality of data units 118a . . . 118n with associated timestamps 120a . . . 120n is stored (at block 700) in a time based file system 104, wherein a timestamp corresponds to a time indicated by a system clock 104. The time indicated by the system clock 104 is changed (at block 702) while the plurality of data units is being stored. A plurality of epochs is stored (at block 704) in a data structure 108, wherein an epoch is a period of time between a starting and an ending timestamp selected from the timestamps 120a . . . 120n, and wherein successive epochs have overlapping time periods. The time based file system 104 is reverted (at block 706) to an earlier point in time based on the plurality of epochs stored in the data structure 108.

In certain additional embodiments, a first data unit of the plurality of data units 118a . . . 118n is written to the time based file system 104 with an associated first timestamp. A second data unit of the plurality of data units 118a . . . 118n is written to the time based file system 104 with an associated second timestamp, wherein the second data unit is written after the first data unit, and wherein no data units are written between the writing of the first data unit and the writing of the second data unit. A new epoch is stored in response to determining that the first timestamp is behind the second timestamp in time (e.g., if the first timestamp is 2 PM and the second timestamp is 1 PM, then the first timestamp is "behind" the second timestamp), wherein the second data unit is associated with the new epoch, and wherein the new epoch and an immediately previously stored epoch associated with the first data unit have an overlapping time period.

Although embodiments have been described with respect to a time based file system, the mechanisms for tracking and reporting epochs may also be applied to traditional file systems as a tool in security auditing and debugging. In these cases the GUI component of viewing and navigating may not be applicable but epoch information may be used to flag, debug or leave clues for forensic analysis of file system alterations. In certain alternative embodiments, the epoch information is stored in metadata structures on the disk and optionally in memory when the memory is allocated.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
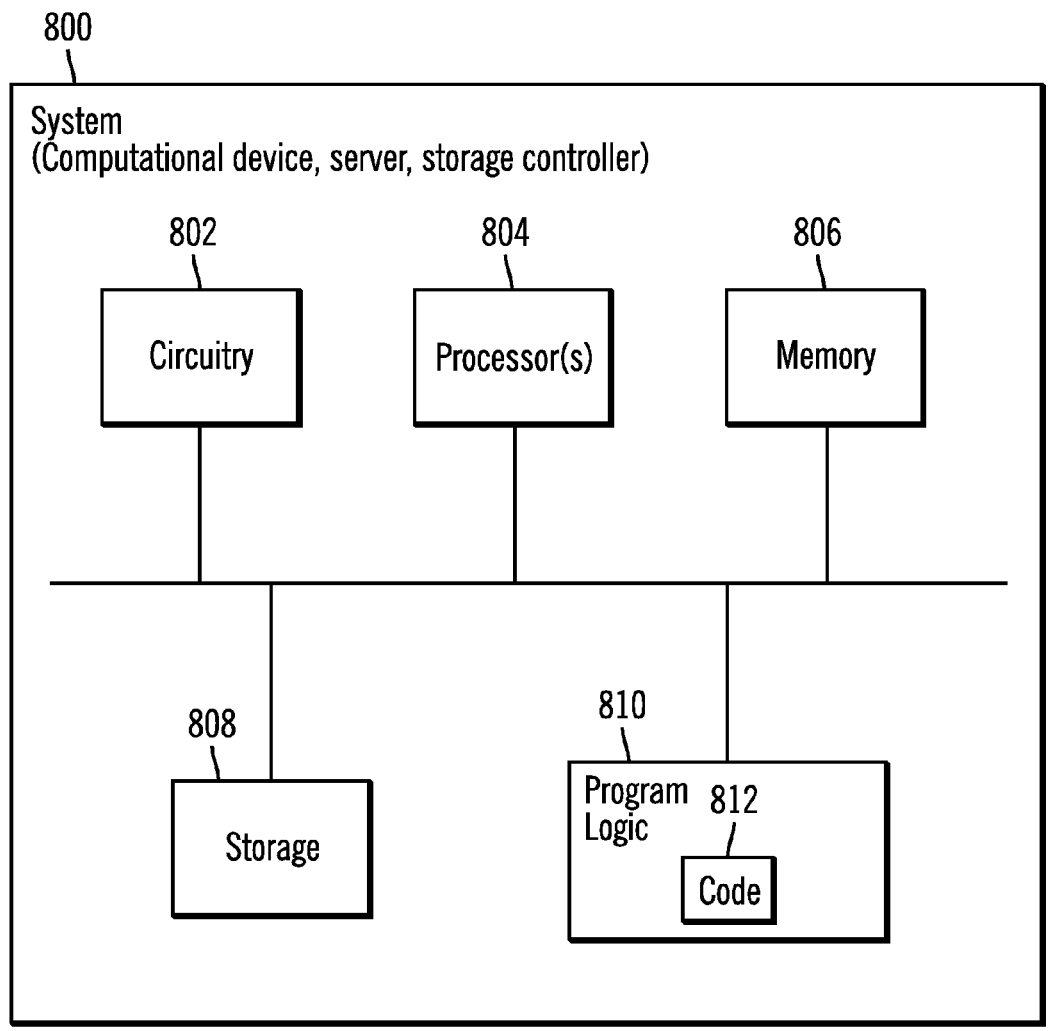
FIG. 8 illustrates a block diagram that shows certain elements that may be included in the computational device of the computing environment of FIG. 1, in accordance with certain embodiments.

FIG. 8 illustrates a block diagram that shows certain elements that may be included in the computational device 102 in accordance with certain embodiments. One or more of the computational devices 102 either individually or collectively may also be referred to as a system 800, and may include a circuitry 802 that may in certain embodiments include a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising,
    writing a first data unit with an associated first timestamp and a first epoch, wherein the first timestamp corresponds to time indicated by a system clock;
    subsequent to the writing of the first data unit, modifying the system clock by changing the time indicated by the system clock;
    subsequent to the modifying of the system clock, writing a second data unit with an associated second timestamp corresponding to the time indicated by the modified system clock, wherein no data units are written between the writing of the first data unit and the writing of the second data unit;
    in response to the writing of the second data unit, determining whether the first timestamp is behind the second timestamp in time;
    in response to determining that the first timestamp is behind the second timestamp in time, associating the second data unit with a second epoch; and
    in response to determining that the first timestamp is not behind the second timestamp in time, associating the second data unit with the first epoch.

2. The method of claim 1, wherein the first epoch and the second epoch have overlapping time periods, wherein each of the first epoch and the second epoch has an associated starting timestamp and an ending timestamp.

3. The method of claim 2, further comprising:
    indicating the starting timestamp of the second epoch to be the second timestamp.

4. The method of claim 3, further comprising:
    indicating the ending timestamp of the second epoch to be null, wherein the ending timestamp of the second epoch is filled in response to a new epoch being started; and
    indicating the ending timestamp of the first epoch to be the first timestamp.

5. The method of claim 1, wherein an epoch number of the second epoch is one more than the epoch number of the first epoch.

6. A system, comprising:
    circuitry;
    a memory coupled to the circuitry; and
    a processor coupled to the memory and the circuitry, wherein the processor performs operations, the operations comprising:

writing a first data unit with an associated first timestamp and a first epoch, wherein the first timestamp corresponds to time indicated by a system clock;

subsequent to the writing of the first data unit, modifying the system clock by changing the time indicated by the system clock;

subsequent to the modifying of the system clock, writing a second data unit with an associated second timestamp corresponding to the time indicated by the modified system clock, wherein no data units are written between the writing of the first data unit and the writing of the second data unit;

in response to the writing of the second data unit, determining whether the first timestamp is behind the second timestamp in time;

in response to determining that the first timestamp is behind the second timestamp in time, associating the second data unit with a second epoch; and in response to determining that the first timestamp is not behind the second timestamp in time, associating the second data unit with the first epoch.

7. The system of claim 6, wherein the first epoch and the second epoch have overlapping time periods, wherein each of the first epoch and the second epoch has an associated starting timestamp and an ending timestamp.

8. The system of claim 7, the operations further comprising:
indicating the starting timestamp of the second epoch to be the second timestamp.

9. The system of claim 8, the operations further comprising:
indicating the ending timestamp of the second epoch to be null, wherein the ending timestamp of the second epoch is filled in response to a new epoch being started; and
indicating the ending timestamp of the first epoch to be the first timestamp.

10. The system of claim 6, wherein an epoch number of the second epoch is one more than the epoch number of the first epoch.

11. A storage device, wherein code stored in the storage device when executed by a processor causes operations, the operations comprising:
writing a first data unit with an associated first timestamp and a first epoch, wherein the first timestamp corresponds to time indicated by a system clock;
subsequent to the writing of the first data unit, modifying the system clock by changing the time indicated by the system clock;
subsequent to the modifying of the system clock, writing a second data unit with an associated second timestamp corresponding to the time indicated by the modified system clock, wherein no data units are written between the writing of the first data unit and the writing of the second data unit;
in response to the writing of the second data unit, determining whether the first timestamp is behind the second timestamp in time;
in response to determining that the first timestamp is behind the second timestamp in time, associating the second data unit with a second epoch; and
in response to determining that the first timestamp is not behind the second timestamp in time, associating the second data unit with the first epoch.

12. The storage device of claim 11, wherein the first epoch and the second epoch have overlapping time periods, wherein each of the first epoch and the second epoch has an associated starting timestamp and an ending timestamp.

13. The storage device of claim 12, the operations further comprising:
indicating the starting timestamp of the second epoch to be the second timestamp.

14. The storage device of claim 13, the operations further comprising:
indicating the ending timestamp of the second epoch to be null, wherein the ending timestamp of the second epoch is filled in response to a new epoch being started; and
indicating the ending timestamp of the first epoch to be the first timestamp.

15. The storage device of claim 11, wherein an epoch number of the second epoch is one more than the epoch number of the first epoch.

16. A method for deploying computing infrastructure, comprising integrating computer-readable code into a computing system, wherein the code in combination with the computing system performs operations, the operations comprising:
writing a first data unit with an associated first timestamp and a first epoch, wherein the first timestamp corresponds to time indicated by a system clock;
subsequent to the writing of the first data unit, modifying the system clock by changing the time indicated by the system clock;
subsequent to the modifying of the system clock, writing a second data unit with an associated second timestamp corresponding to the time indicated by the modified system clock, wherein no data units are written between the writing of the first data unit and the writing of the second data unit;
in response to the writing of the second data unit, determining whether the first timestamp is behind the second timestamp in time;
in response to determining that the first timestamp is behind the second timestamp in time, associating the second data unit with a second epoch; and
in response to determining that the first timestamp is not behind the second timestamp in time, associating the second data unit with the first epoch.

17. The method for deploying computing infrastructure of claim 16, wherein the first epoch and the second epoch have overlapping time periods, wherein each of the first epoch and the second epoch has an associated starting timestamp and an ending timestamp.

18. The method for deploying computing infrastructure of claim 17, the operations further comprising:
indicating the starting timestamp of the second epoch to be the second timestamp.

19. The method for deploying computing infrastructure of claim 18, the operations further comprising:
indicating the ending timestamp of the second epoch to be null, wherein the ending timestamp of the second epoch is filled in response to a new epoch being started; and
indicating the ending timestamp of the first epoch to be the first timestamp.

20. The method for deploying computing infrastructure of claim 16, wherein an epoch number of the second epoch is one more than the epoch number of the first epoch.

* * * * *